United States Patent Office 3,435,093
Patented Mar. 25, 1969

3,435,093
POLYMER BLENDS OF POLYETHYLENE TEREPHTHALATE AND α-OLEFIN, α,β-UNSATURATED CARBOXYLIC ACID COPOLYMERS
Oswald James Cope, Wilmington, Del., assignor to E. I. du Pont de Nemours and Company, Wilmington, Del., a corporation of Delaware
No Drawing. Filed Dec. 17, 1965, Ser. No. 514,681
Int. Cl. C08g *39/10, 41/04*
U.S. Cl. 260—857                5 Claims

ABSTRACT OF THE DISCLOSURE

Blend of polyethylene terephthalate and an ionic hydrocarbon copolymer of an alpha olefin and a 3–5 carbon α,β-ethylenically unsaturated acid, in which the carboxylic acid groups are randomly distributed over the copolymer. The acid groups may be neutralized. The blend may also contain polyhexamethylene adipamide.

---

This invention relates to polymers, and, more specifically, to blends of synthetic polymers.

Polyethylene terephthalate is produced on a large scale at relatively low cost, and finds extensive use in the production of synthetic fibers. It has not, however, been exploited as a molding resin due to its insufficient toughness for that utility. In contrast to polyethylene terephthalate, polyhexamethylene adipamide (66 nylon) has an excellent balance of properties for use as a molding resin.

This invention provides synthetic polymer blends which possess a combination of properties different from and superior to, in many respects, those of any of the individual components of the blends. For example, a surprising improvement in toughness is achieved in the blends of this invention. Moreover, this invention provides blended resins which exhibit less mold shrinkage and water uptake than does polyhexamethylene adipamide.

The synthetic polymer blends of this invention comprise polyethylene terephthalate and an ionic hydrocarbon copolymer of α-olefins and α,β-ethylenically unsaturated carboxylic acids.

The ionic hydrocarbon copolymer employed as a component of the blends of this invention is a copolymer of α-olefins having the formula R—CH=CH$_2$, wherein R is a radical selected from the class consisting of hydrogen and alkyl radicals containing 1–3 carbon atoms, and α,β-ethylenically unsaturated carboxylic acids containing 3–5 carbon atoms. The α-olefin content of the copolymer is at least 70 mole percent, based on the ionic copolymer.

The carboxylic acid groups are randomly distributed over the copolymer molecules and can be 0–100% neutralized by metal cations distributed over the carboxylic acid groups of the copolymer. The metal cations can be derived from metals selected from the class consisting of Groups I, II, and IV of the Periodic Table of the elements published by the Fisher Scientific Company.

Illustrative of the α-olefins useful in the preparation of the ionic copolymer component of the blends of this invention are ethylene, propylene, butene-1 and pentene-1. Illustrative of α,β-ethylenically unsaturated carboxylic acids useful in the preparation of said ionic copolymer are acrylic acid, methacrylic acid, ethacrylic acid, itaconic acid, maleic acid, fumaric acid, and monoesters of itaconic acid, maleic acid, and fumaric acid. Other monomers can, of course, be terpolymerized in the copolymer.

The carboxylic acid groups of the ionic copolymer component of the polymer blends are randomly distributed over the copolymer molecules. A technique by which this random distribution can be achieved is the following. The copolymerization of the α-olefin and the carboxylic acid monomers can be conducted in a one-phase system, that is, in a medium, such as benzene or ethylene, in which the monomers are soluble. The medium may be in either liquid or vaporized form. Preferably, and especially when relatively small amounts of the carboxylic acid component are desired in the copolymer, the process can be continuous, the monomers being fed into the reactor in the ratio of their relative polymer-forming reactivities, and the residence time in the reactor being limited to prevent all the alkylene monomer feed from being converted into polymer.

The relative proportions of polyethylene terephthalate and ethylene/methacrylic acid in the blends can be varied considerably. The weight of the ethylene/methacrylic acid copolymer present in the blend can be about 5–150% of that of polyethylene terephthalate. The preferred composition is that wherein the weight of the ethylene/methacrylic acid copolymer is about 5–45% of that of polyethylene terephthalate. The optimum composition is that wherein the ethylene/methacrylic acid copolymer is about 25% of that of polyethylene terephthalate.

In a preferred embodiment of this invention, the polymer blends comprise polyethylene terephthalate and an ethylene/methacrylic acid copolymer comprising 80–97 weight percent ethylene and 3–20 weight percent methacrylic acid. The carboxylic acid groups of the ethylene/methacrylic acid copolymer may be unneutralized or neutralized up to 100% by a cation derived from a metal of Group I, II, or IV. Preferably, the carboxylic acid groups of the ethylene/methacrylic acid copolymer are neutralized to the extent of 40–60%. The preferred cations used in the neutralization of said carboxylic acid groups are Na$^+$, K$^+$, Ca$^{++}$, Mg$^{++}$, Zn$^{++}$, and Pb$^{++}$.

Blends of polyethylene terephthalate and ionic hydrocarbon copolymer can be modified by the addition of polyhexamethylene adipamide (66 nylon). The weight ratio of the polyethylene terephthalate and ionic copolymer remain within the range described above, and the weight of polyhexamethylene adipamide can be about 20–500% of that of polyethylene terephthalate. The amount of polyhexamethylene adipamide added is chosen depending upon the particular properties desired in the product.

Terblends of polyethylene terephthalate, ethylene/methacrylic acid copolymer, and polyhexamethylene adipamide are especially useful in the molding of precision parts.

The polymer blends of this invention can be further modified by the addition of pigments, fillers, etc. Illustrative of useful pigments are iron oxides, cadmium red, Rhodamine, chrome yellow, chrome green, and phthalocyanine blue. Fillers which can be added to the blends of this invention are glass fiber, talc, chalk, asbestos, polyethylene, and titanium dioxide.

The synthetic polymer components of these blends can be prepared separately and then subsequently blended by techniques such as melt extrusion or batch mixing.

In order that the invention may be better understood the following detailed examples are given in addition to the examples already given above.

EXAMPLES I–V

Blends were prepared by melt extrusion of a mixture of the respective components as described in Tables 1 and 2. The extruder employed was a National Rubber Machinery Company 1½-inch extruder (length to diameter ratio, 20) fitted with a torpedo-head mixing screw and a ¼-inch by ¼-inch die. Under typical extrusion conditions the resin temperatures were 250° C. at the rear of the barrel, 280° C. at the front of the barrel, and 280° C. at the die. The screw speed was 40 r.p.m. Blended material was extruded into a 15–20° C. aqueous quench bath. Specimens of extruded blends were prepared for physical testing by injection-molding on a 3-ounce Van Dorn reciprocating-screw molding machine. The barrel temperature of the injection-molder was 280° C. and the mold temperature 18° C. The extrusion cycle was 6/4 seconds.

Physical tests included those for ultimate tensile strength, percent elongation, flexural modulus, and Izod impact strength, as determined by ASTM procedures D638, D638, D790, and D256, respectively. Linear mold shrinkage was measured. Water uptake was determined by boiling the specimen in water until the weight became constant.

The physical test specimens of Examples I–III and standard A (Table 1) were annealed at 200° C. for 16 hours under nitrogen so as to induce maximum crystallinity. Blend compositions were as noted on the table.

The physical test specimens of Examples IV and V and standard B (Table 2) were not annealed before testing.

The data in Table 1 show that when an ionic hydrocarbon copolymer of the type herein described is blended into polyethylene terephthalate, the toughness of the resultant blend far exceeds that of the polyethylene terephthalate alone. Due to this unexpected result the utility of polyethylene terephthalate in resin compositions is enhanced.

Table 2 describes terblends which are produced by the modification of the blends above by polyhexamethylene adipamide. These terblends show a marked decrease in mold shrinkage as compared with that of polyhexamethylene adipamide, accompanied by a striking diminution of water uptake. These data demonstrate the excellent dimensional stability of the blends. Dimensional stability is important when the resin is to be employed in the fabrication of precision parts.

The foregoing detailed description has been given for clearness of understanding only, and no unnecessary limitations are to be understood therefrom. The invention is not limited to the exact details shown and described since obvious modifications will occur to those skilled in the art.

TABLE 1

| Example Number: | Blend Composition [1] | Tensile Strength p.s.i. | Elongation, Percent | Flexural Modulus, p.s.i. | Izod Impact, ft. lb./in. notch |
| --- | --- | --- | --- | --- | --- |
| I | 80% PET; 20% E/MAA; (10% MAA); (50% COO⁻ as Zn⁺⁺) | 8,850 | 36 | 320,000 | 1.12 |
| II | 80% PET; 20% E/MAA; (10% MAA); (60% of COO⁻ as Na⁺⁺) | 9,360 | 40 | 374,000 | 0.69 |
| III | 80% PET; 20% E/MAA; (10% MAA); (COO⁻ unneut.) | 9,040 | 14 | 357,000 | 0.52 |
| A | 100% PET | 12,900 | <5 | 465,000 | 0.26 |

[1] PET is polyethylene terephthalate; E/MAA is ethylene/methacrylic acid copolymer; COO⁻ refers to the carboxylate groups of the acid copolymer. Percentages are by weight except for percent neutralization of carboxylic acid groups.

TABLE 2

| Number: | Blend [1] Composition | Tensile Strength, p.s.i. | Elongation, Percent | Flexural Modulus, p.s.i. | Izod Impact, ft. lb./in. notch | Mold Shrinkage, in. per in. | Water, Uptake Percent |
| --- | --- | --- | --- | --- | --- | --- | --- |
| Example IV | 70% PET; 25% PHMA; 5% E/MAA; (10% MAA); (50% COO⁻ as Zn⁺⁺) | 8,810 | 140 | 319,000 | 0.54 | 0.003 | 2.8 |
| V | 47.5% PET; 47.5% PHMA; 5% E/MAA; (10% MAA); (50% COO⁻ as Zn⁺⁺) | 9,490 | 120 | 318,000 | 0.95 | 0.006 | 4.5 |
| B | 100% PHMA | | | | | 0.015 | 9 |

[1] PET, E/MAA, COO⁻, see footnote to Table 1. PHMA is polyhexamethylene adipamide. Percentages are by weight except for percent neutralization of carboxylic acid groups.

I claim:
1. Polymer blends comprising polyethylene terephthalate and an ionic hydrocarbon copolymer, said ionic hydrocarbon copolymer being of α-olefins having the formula R—CH=CH₂, wherein R is a radical selected from the class consisting of hydrogen and alkyl radicals containing 1–3 carbon atoms, and α,β-ethylenically unsaturated carboxylic acids containing 3–5 carbon atoms, the α-olefin content of the said ionic copolymer being at least 70 mole percent based on the ionic copolymer, the carboxylic acid content of said ionic copolymer being between 3 and 20 weight percent based on the ionic copolymer, the carboxylic acid groups of said ionic copolymer being randomly distributed over the copolymer molecules, said carboxylic acid groups being 0–100% neutralized by metal cations distributed over the carboxylic acid groups of the copolymer, said metal cations being derived from metals selected from the class consisting of Groups I, II, and IV, the weight of the ionic hydrocarbon copolymer present in the blend being about 5–150% of that of polyethylene terephthalate.

2. Polymer blends according to claim 1 wherein the ionic hydrocarbon copolymer is an ethylene/methacrylic acid copolymer, the weight of said copolymer being 5–150% of that of polyethylene terephthalate, said ethylene/methacrylic acid copolymer comprising 80–97 weight percent ethylene and 3–20 weight percent methacrylic acid.

3. Polymer blends according to claim 2 wherein the weight of said ethylene/methacrylic acid copolymer is 5–45% of that of said polyethylene terephthalate.

4. Polymer blends according to claim 2 comprising polyethylene terephthalate, an ethylene/methacrylic acid copolymer, and polyhexamethylene adipamide, the weight of said ethylene/methacrylic acid copolymer in the blend being 5–150% of that of polyethylene terephthalate, and the weight of polyhexamethylene adipamide being 20–500% of that of polyethylene terephthalate.

5. Polymer blends of claim 2 wherein 40–60% of said carboxylic acid groups are neutralized by said metal cations.

References Cited

UNITED STATES PATENTS 3,207,816   9/1965   Dugliss _____ 260—873

FOREIGN PATENTS 975,186   11/1964   Great Britain.
1,182,820  11/1964   Germany.

SAMUEL H. BLECH, *Primary Examiner.*

PAUL LIEBERMAN, *Assistant Examiner.*

U.S. Cl. X.R.

260—78, 873, 40, 41, 88.1